(12) United States Patent
Takahashi et al.

(10) Patent No.: US 7,536,321 B2
(45) Date of Patent: May 19, 2009

(54) ESTIMATED TIME OF ARRIVAL (ETA) SYSTEMS AND METHODS

(75) Inventors: Shinichi Takahashi, Syosset, NY (US); Takenari Kawano, Port Washington, NY (US); Kazuo Tsugu, Roselyn Heights, NY (US); Ken Nishioka, Glen Cove, NY (US)

(73) Assignee: Canon U.S.A., Inc., Lake Success, NY (US)

( * ) Notice: Subject to any disclaimer, the term of this patent is extended or adjusted under 35 U.S.C. 154(b) by 456 days.

(21) Appl. No.: 10/766,893

(22) Filed: Jan. 30, 2004

(65) Prior Publication Data

US 2005/0171856 A1   Aug. 4, 2005

(51) Int. Cl.
G06F 17/30 (2006.01)
(52) U.S. Cl. .................... 705/27; 705/26; 705/7
(58) Field of Classification Search .............. 705/26, 705/27, 7
See application file for complete search history.

(56) References Cited

U.S. PATENT DOCUMENTS

| | | | |
|---|---|---|---|
| 4,630,216 A | 12/1986 | Tyler et al. | |
| 5,043,908 A | 8/1991 | Manduley et al. | |
| 5,072,400 A | 12/1991 | Manduley | |
| 5,450,317 A | 9/1995 | Lu et al. | 364/402 |
| 5,869,819 A | 2/1999 | Knowles et al. | |
| 5,946,663 A | 8/1999 | Tanaka et al. | 705/8 |
| 5,987,423 A | 11/1999 | Arnold et al. | 705/14 |
| 6,047,264 A | 4/2000 | Fisher et al. | |
| 6,069,895 A | 5/2000 | Ayandeh | 370/399 |
| 6,073,114 A | 6/2000 | Perkins, III et al. | |
| 6,094,642 A | 7/2000 | Stephenson et al. | |
| 6,148,291 A | 11/2000 | Radican | 705/28 |
| 6,470,323 B1 * | 10/2002 | Suzuki et al. | 705/27 |
| 6,564,216 B2 | 5/2003 | Waters | 707/10 |
| 6,609,108 B1 | 8/2003 | Pulliam et al. | 705/27 |
| 6,622,127 B1 | 9/2003 | Klots et al. | 705/28 |
| 6,654,726 B1 | 11/2003 | Hanzek | 705/26 |
| 6,795,823 B1 * | 9/2004 | Aklepi et al. | 707/10 |
| 7,222,081 B1 * | 5/2007 | Sone | 705/7 |
| 2002/0007299 A1 * | 1/2002 | Florence | 705/9 |
| 2002/0188499 A1 | 12/2002 | Jenkins et al. | 705/10 |

(Continued)

FOREIGN PATENT DOCUMENTS

| | | |
|---|---|---|
| GB | 2 332 540 | 6/1999 |
| WO | WO 99/33040 | 7/1999 |
| WO | WO 00/46728 | 8/2000 |
| WO | WO 02/19046 | 3/2002 |

OTHER PUBLICATIONS

Dilger, Karen; "Ship to Shore," Manufacturing Systems, Feb. 1999; v17n2pp. 83-90; Dialog file 15 #01805149, 6 pgs.*

(Continued)

*Primary Examiner*—Robert M. Pond
(74) *Attorney, Agent, or Firm*—Fitzpatrick, Cella, Harper & Scinto

(57) ABSTRACT

A system on a network provides estimated time of arrival information to a client located on the network. The system is adapted to present to the client pages for eliciting a product inquiry including a product number. The system receives the product inquiry, determines estimated time of arrivals for various destinations for at least one in-transit unit having the product number, and transmits to the client the estimated time of arrivals.

44 Claims, 15 Drawing Sheets

U.S. PATENT DOCUMENTS

| | | |
|---|---|---|
| 2003/0083947 A1 | 5/2003 | Hoffman et al. ............... 705/22 |
| 2003/0195822 A1 | 10/2003 | Tatge et al. ................... 705/26 |
| 2004/0225573 A1 | 11/2004 | Ling ............................ 705/26 |
| 2004/0243452 A1 | 12/2004 | Barton et al. ................... 705/7 |
| 2005/0027660 A1 | 2/2005 | Leroux et al. ............... 705/400 |
| 2005/0075950 A1 | 4/2005 | Lewis et al. ................... 705/28 |
| 2005/0149453 A1 | 7/2005 | Amling et al. ................ 705/60 |
| 2006/0095343 A1 | 5/2006 | Clarke et al. .................. 705/26 |
| 2006/0229895 A1 | 10/2006 | Kodger, Jr. ..................... 705/1 |

OTHER PUBLICATIONS

World Wide Web at URL: http://www.fedex.com/us/government/international/termsandconditions/routing.html as of Jan. 11, 2004.

World Wide Web at URL: http://www.fedex.com/us/government/international/termsandconditions/routing.html?link=4 as of Jan. 11, 2004.

International Preliminary Report on Patentability, PCT/US05/03328, dated Sep. 25, 2007.

\* cited by examiner

| Home | Inquiry | Forms | Parts Info | A/P | Announcement | Help | Logout |

Merchandise/Supply Order
As Of: 12/19/2003 09:00:49

- 20
- 21a Purchase Order # 12347
- 21b Ship To A078— IMAGING CO–44 MAIN ST./#113, STERLING, VA-20166
- Inter-Territorial Drop Ship  21i
- 21c Ship Method  UPS Ground
- 21d Carrier Account #
- 21e Carrier Name  N/A   Ship Complete   21j
- 21f Attention
- 21g Special Shipping Instructions   Carrier Contact   Carrier Tel   (999-999-9999)  N/A  21k
- 21h Special Instructions for Order Desk

[Continue] [View Saved Orders] [Cancel Order] [Order Upload]
  24          22               25            23

| # | Item # | Description | Incr. Qty | Qty(Each) | Ship Complete | Unit Price | Amount | Delete |
|---|---|---|---|---|---|---|---|---|
| 1 | 6583A002BA | IR2200 120V UL | | 10 | ☐ | $2,580.00 | $25,800.00 | ☐ |
| 2 | 6378A003BA | IR3300 120V UL | | 10 | ☐ | $4,095.00 | $40,950.00 | ☐ |
| 3 | [Find] | | | | ☐ | | | |
| 4 | [Find] | | | | ☐ | | | |
| 5 | [Find] | | | | ☐ | | | |
| 6 | [Find] | | | | ☐ | | | |
| 7 | [Find] | | | | ☐ | | | |
| 8 | [Find] | | | | ☐ | | | |
| 9 | [Find] | | | | ☐ | | | |
| 10 | [Find] | | | | ☐ | | | |
| | | | | | | Total Amount | $66,750.00 | |

Tabs: Home | Inquiry | Forms | Parts Info | A/P | Announcement | Help | Logout

*Merchandise/Supply Order Details*   As Of: 12/19/2003 09:00:49

Buttons: Cancel Order | Save Order | Get Price* | Continue
         | Catalog | Edit Header | Add Lines | Delete Lines Labels: 31a, 31b, 31h, 31c, 31d, 31e, 31f, 31g, 24, 25, 32, 33, 34, 35, 36, 37

FIG. 4

Order ETA

| Line # | 2 |
|---|---|
| Item # | 6378A003BA |
| Description | IR3300 120V UL |
| Order Qty | 10 |
| Total Weight | 2290 LB |
| Ship to Zipcode | 20166 |

| | Default W/H | Quantity | Status | Stock-In Date |
|---|---|---|---|---|
| ⦿ | NEW JERSEY | 10 | Not Available | 12/19/2003 |

| | Alternate W/H | Quantity | Status | Freight Difference |
|---|---|---|---|---|
| ○ | ATLANTA | 10 | Available | 26% More |
| ○ | CHICAGO | 10 | Available | 98% More |
| ○ | DALLAS | 10 | Available | 99% More |
| ○ | LOS ANGELES | 10 | Available | 149% More |

[Save] [Cancel]

As Of: 12/19/2003 09:00:49

*Availability

| | | Unit Price | Amount |
|---|---|---|---|
| Yes | | $2,580.00 | $25,800.00 |
| No | | $4,095.00 | $40,950.00 |
| | **Total Amount | | $66,750.00 |

[Submit]

FIG. 5

ETA Inventory Inquiry

Product Number: 6378A003BA  [LOV]   Description: IR3300 120V UL   [Inquire] [Download]

Show [10] rows per page(10-100) [Change]

| W/H | INVENTORY | INTRANSIT | BACK ORDER |
|---|---|---|---|
| 11 | 52 | 144 | 0 |
| 21 | 0 | 0 | 0 |
| 22 | 0 | 432 | 33 |
| 25 | 0 | 0 | 0 |
| 32 | 264 | 216 | 0 |
| 41 | 139 | 72 | 0 |
| 42 | 0 | 0 | 0 |
| 51 | 0 | 0 | 0 |
| 52 | 0 | 0 | 0 |
| 55 | 275 | 360 | 0 |
| TTL | 730 | 1224 | 33 |

Total Record Number: 11

FIG. 7A

ETA Inquiry (Product)

Product Number: 6378A003BA   Description: IR3300 120V UL   [Inquire] [Download]

Show [10] rows per page (10-100) [Change]

| DO # | W/H | QTY | ETAWHDATE | QTY Allocated | CONTAINER # | INVOICE # |
|---|---|---|---|---|---|---|
| D4993632 | 22 | 72 | 12/18/2003 | 0 | XFER | XFER |
| FAULV3213 | 22 | 72 | 12/19/2003 | 0 | NYKU6190355 | SG-03/51038 |
| FAULV3214 | 22 | 72 | 12/11/2003 | 33 | NYKU6057975 | SG-03/51038 |
| FAULV3401 | 22 | 72 | 12/19/2003 | 0 | NYKU6068537 | SG-03/51058 |
| FAULV3402 | 22 | 72 | 12/19/2003 | 0 | NYKU6189502 | SG-03/51058 |
| FAUNJ0401 | 22 | 72 | 12/23/2003 | 0 | KKFU1409692 | SG-03/51050 |
| Morning STOCK | 22 | 94 | | 94 | STOCK | STOCK |

Total Record Number: 7

FIG. 7B

ETA Diversion System

Product Number: 1388A003AA  Description:

Vessel #: 1X9.3JF    # of Containers: 10    Qty: 500

In Transit Total: 750    ETA Port: 11/20    Due Date: 11/15    [Approve]

Unit of 1 Container=50

| WH | Sales History (6 month) | Current Inventory | Current B/O | Diversion # of Container | Qty | Suggested Diversion Plan | ETA Replied | ETA WH |
|---|---|---|---|---|---|---|---|---|
| 11 | 500 | 0 | 50 | 1 | 50 | 100 | 50 | 11/28 |
| 22 | 3000 | 100 | 0 | 1 | 50 | 200 | | 11/28 |
| 32 | 1500 | 0 | 100 | 2 | 100 | 150 | 100 | 11/27 |
| 41 | 300 | 50 | 0 | 1 | 50 | 0 | | 11/26 |
| 52 | 2000 | 0 | 150 | 3 | 150 | 150 | 150 | 11/20 |
| Total | 7300 | 150 | 300 | | | 600 | | |

FIG. 7D

| Origin | Transit Time Formula | Carrier | Transport Container Service | Destination | Calendar / Transit Time (from West Coast) ||||| 
|---|---|---|---|---|---|---|---|---|---|
| | | | | | LA 52 | Dallas 41 | Chicago 32 | Atlanta 11 | NJ 22 |
| JAPAN | Current Transit Time Formula (To Warehouse) | | | | +5 | +11 | +12 | +16 | +16 |
| | | Shipping Co. A | Transport Service A | R/R | - | +5 | +6 | +7 | +7 |
| | | | | W/H | +3 | +9 | +9 | +10 | +10 |
| | | Shipping Co. B | Transport Service B | R/R | - | +5 | +5 | +6 | +9 |
| | | | | W/H | +4 | +10 | +10 | +11 | +12 |
| CHINA | Current Transit Time Formula (To Warehouse) | | | | +4 | +10 | +11 | +15 | +15 |
| | | Shipping Co. C | Transport Service C | R/R | - | +4 | +5 | +10 | +10 |
| | | | | W/H | +4 | +7 | +10 | +13 | +13 |
| | | Shipping Co. D | Transport Service D | R/R | - | +5 | +5 | +7 | +7 |
| | | | | W/H | +3 | +10 | +10 | +10 | +10 |

FIG. 7E

ESTIMATED TIME OF ARRIVAL (ETA) SYSTEMS AND METHODS

BACKGROUND OF THE INVENTION

1. Field of the Invention

This invention relates generally to computer software systems and, more particularly to computer systems for determining the estimated time of arrival of products.

2. Description of the Related Art

Product availability and shipping costs are key factors in determining whether a dealer makes a contemplated purchase order. If a product is not available because it is out of stock, a dealer may decide to order another manufacturer's product. Even if the product is available, a dealer may still decide to order a product from another manufacturer if shipping costs are too high.

Manufacturers use various storage warehouses which are strategically located to lower freight costs to the dealers. Each dealer is assigned a default warehouse, but has the option to order from secondary (i.e., alternate) warehouses as well. However, the default warehouse is typically located closer to the dealer than the secondary warehouses. Thus when ordering from a secondary warehouse, the dealer usually expects to pay a higher freight cost.

Sometimes the default warehouse is out of stock and the dealer has no other choice except to order from the secondary warehouse or order another product—perhaps one made by another manufacturer. If time is of the essence and the buyer is not willing to pay the extra freight cost, the manufacturer may end up loosing the sale. Dealers also become annoyed when they must speak to a manufacturer's representative to find out what order options are available. In addition, disputes can arise after a dealer orders a product on a rush basis without realizing that freight charges will be higher because the product was available only from the secondary warehouse. Without having control as to which warehouse the product is being shipped from, the dealer is usually unpleasantly surprised by the extra freight cost. In any event, if a manufacturer's products are consistently out of stock or not available from the default warehouse, the customer will be inconvenienced and dissatisfied with the manufacturer's ordering services.

An early conventional business model involves replying back to a requester with an estimated availability date either over the phone or through e-mail communication. In such models, estimated time of arrival calculations were performed manually by checking in-transit container schedules and estimated time of arrival time tables generated using historical data. It was very inefficient to determine which warehouse is capable of supplying the merchandise and to calculate freight cost differences manually. Networked computer systems have begun to improve these inefficiencies.

Data interchange systems are well known. These systems interchange data related to a business transaction such as order entry data. One well known data interchange system uses the Electronic Data Interchange (EDI) method of transferring business communications between dealers and suppliers. EDI systems transfer data in a structured manner, using agreed message standards, from one computer system to another. Other order entry systems having different data interchange formats can be used to generate business communications as well. Proprietary network access systems, for instance, allow remote dealers (or intranet or extranet users) to access ordering systems using different specialized interfaces and exchange methods.

U.S. Pat. No. 6,609,108 purports to provide an on-line method and system in which a consumer is provided real-time information, prior to the placement of an order or purchase by the consumer, regarding the availability and status of a configured product in relation to the product's manufacturing and delivery process or "pipeline". The product delivery time to a consumer is reduced by locating and "tagging" an available product at various stages in a product. pipeline, including scheduled and unscheduled order banks, final assembly, in-plant inventory, in-transit stock and dealer inventory. Real-time pricing and comparison data is provided for individual product features or options.

Tracking systems are also well developed, including those using satellites and other electronic technology, to obtain real-time data on in-transit locations of containers. Inventory accounting and management systems that ascertain the contents of very large warehouses to a high level of detail at any point in time are also well developed. An example of a container and inventory monitoring method and system is disclosed in U.S. Pat. No. 6,148,291.

Transport carriers, such as Federal Express®, have the ability to reroute shipments when authorized by the sender. However, special handling charges are generally billed to the customer for each rerouted package. The customer may also decide to stop the shipment before it gets to a final destination. In other words, instead of rerouting the package, the package is held at a particular destination along the way. This requires that someone with authority call the carrier company with pertinent information at hand. A transport carrier can also divert any shipments (including by using other carriers) to facilitate its delivery.

In addition, the management of order reception, processing, procurement, logistics, warehouse functions and tracking of products has been computerized and integrated. U.S. Pat. No. 5,987,423 discloses an object oriented programming (OOP) framework including an order management mechanism that tracks sales orders received and matches them to warehouse inventory, a sales order mechanism that processes sales orders and a purchase order mechanism that processes purchase orders. The '423 patent further discloses interfacing underlying business functions such as accounting, warehouse management and sales and purchase order tracking.

Despite the promise of computerized and integrated order processing systems, such current commerce software is typically of limited capability. The cost of inventory is an area of constant concern to businesses. Too much inventory not only eats up the working capital of a company and creates cash flow problems, but also requires additional space and people to manage it. The opposite problem of too little inventory can cause production delays and poor customer service. No system has heretofore been described or available that dynamically provides estimated time of arrival information and/or freight cost information based on constantly changing factors such as current shipment status or diversion options. Nor is there a system that includes an automated system which diverts containers based on different factors, such as delayed shipment delivery time, urgent requests, warehouse stock, vendor status, and contract requirements. In addition, current systems do not provide the information dealers want to make informed and economical ordering decisions.

SUMMARY OF THE INVENTION

It is an object of the present invention to provide an effective system in which dealer can get real time estimated time of arrival of a product. It is also an object of the present invention to provide the dealer with the ability to choose from alternate destinations and with estimated freight cost information. Another object of the present invention is to provide in-transit product diversion for providing optimum product allocation. Yet another object of the present invention is to provide the ability to divert shipments due to factors that may change while the product is in-transit.

In accordance with one embodiment of the present invention, a system on a network provides estimated time of arrival information to a client located on the network. The system is adapted to present to the client pages for eliciting a product inquiry including a product number. The system receives the product inquiry, determines estimated time of arrivals for various destinations for at least one in-transit unit having the product number. The system can also transmit to the client the estimated time of arrivals.

In accordance with another embodiment of the present invention, a system is provided which is adapted to transmit to a server on a network product inquiry information including a product number. The system receives estimated time of arrivals to at least one destination for at least one in-transit unit having the product number.

In still another embodiment of the present invention there is provided a system for providing excess freight cost information including excess costs for ordering from at least one secondary destination. The system is adapted to present to a client located on the network one or more pages adapted to elicit a product inquiry including a product number and receive the product inquiry. The system receives from a product weight table database a corresponding product weight, receives from a dealer location database a dealer address, receive from a freight table database at least one freight cost based on the dealer address, and calculate at least one difference in freight cost based on the information stored in the product weight database, the freight database and the dealer location database. The system also transmits to the client the at least one difference in freight cost.

In yet another embodiment of the present invention, a system located on a network linking the system with a server is provided which is adapted to transmit to the server product inquiry information including a product number and a customer identifier. The system receives at least one difference in freight cost for ordering from at least one secondary destination based on the product inquiry.

In yet another embodiment of the present invention, a system on a network automatically diverts one of a plurality of in-transit units having a product number to one of a plurality of destinations. The system is adapted to determine an estimated time of arrival to each of the plurality of destinations for the plurality of in-transit units. The system is further adapted to determine a diversion plan based on sales history information for each of the plurality of warehouses, current inventory information for each of the destinations and in-transit information, the current inventory information including back-order data, the in-transit information including the location of the plurality of in-transit units. Based on the diversion plan, the system diverts the one unit to one of the destinations.

BRIEF DESCRIPTION OF THE DRAWINGS

FIG. 2 is an illustration of an initial order entry screen which allows entry of basic account and shipping information.

FIG. 3 is an illustration of an order details screen which allows entry of product supply order information.

FIG. 4 is an illustration of an order availability screen for providing availability and cost information, and for hyperlinking to an alternative warehouse information and selection screen.

FIG. 5 is an exemplary illustration of an estimated time of arrival information and order option screen, for viewing and selecting default and alternate warehouse delivery order options.

FIG. 7A is an exemplary illustration of an ETA inquiry screen for viewing warehouse current and projected inventory and backorder status for a particular product in accordance with the present invention.

FIG. 7B is an exemplary illustration of an ETA inquiry screen for viewing more detailed ETA and warehouse allocation information for a particular product in accordance with the present invention.

FIG. 7D is an exemplary illustration of a warehouse information and diversion entry screen for viewing warehouse historical and current sales and inventory allocation and for entering diversion instructions via a manual operation in accordance with the present invention.

FIG. 7E is a lead time table showing how long it takes various carrier services to deliver shipments.

DESCRIPTION OF THE PREFERRED EMBODIMENTS

Figure 1:
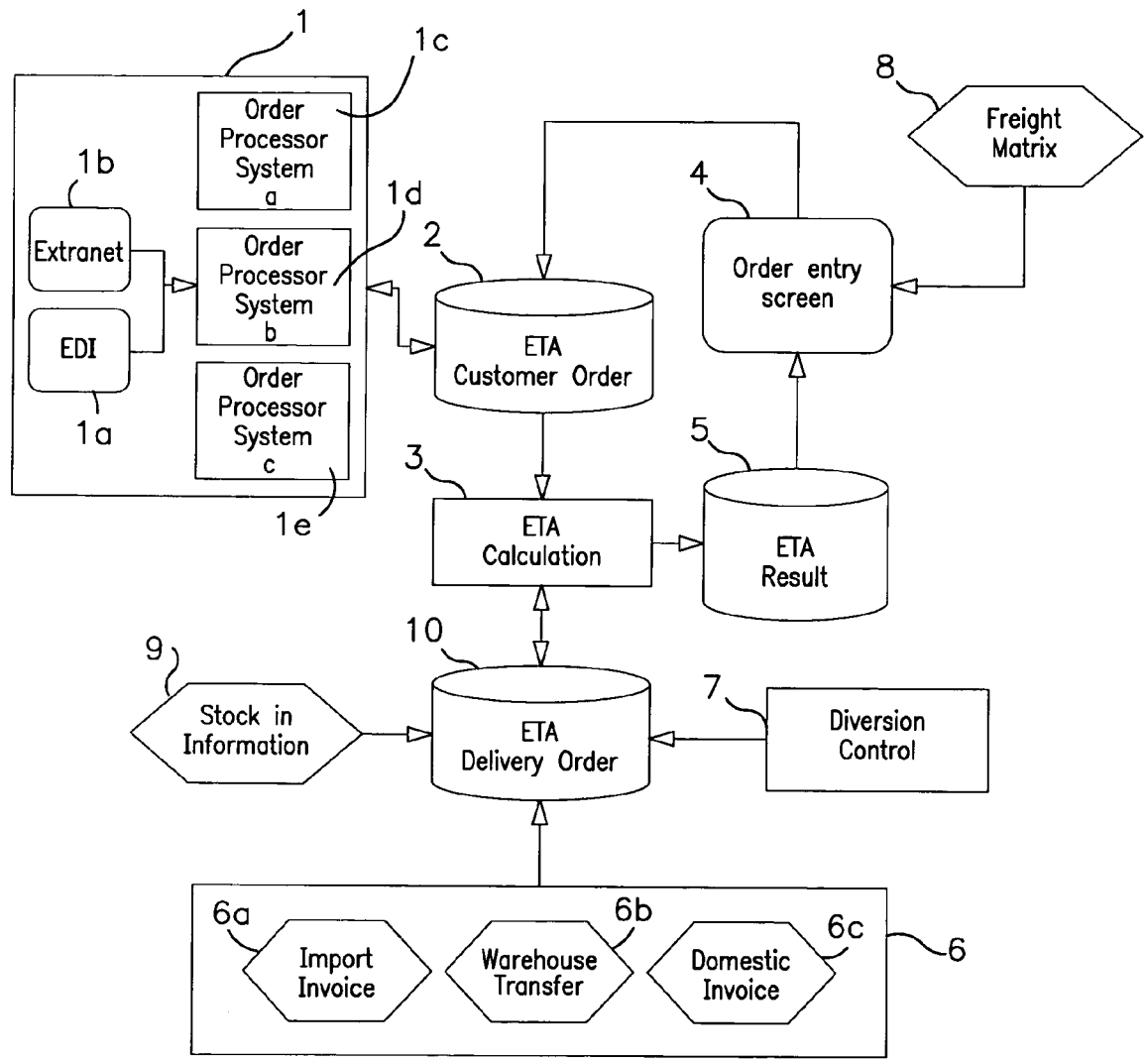
FIG. 1 is a high-level block diagram for implementing the methods and systems of the present invention.

The terms "user", "operator", "customer", "consumer", "dealer", "vendor" and the like mean any person who may benefit from the present invention.

"Manufacturer" means the person or entity manufacturing and selling products.

"Product" means any product under the sun. The words "item" and "unit" are used to identify one product having a product number.

"Computer" may refer to a single computer or to a system of interacting computers. Generally speaking, a computer is a combination of a hardware system, a software operating system and perhaps one or more software application programs. Examples of computers include, without limitation, IBM-type personal computers (PCs) having an operating system such as DOS, Windows, OX/2 or Linux; Macintosh computers; hardware having a JAVA-OS operating system; graphical work stations, such as Sun Microsystems and Silicon Graphics Workstations having a UNIX operating system; PalmPilots; and PilotPCs.

"Network" means a connection between any two or more computers, which permits the transmission of data. One example of a network is the Internet.

"Client/server" architecture is a network architecture in which each computer or process on the network is either a "client" or a "server". A "server" is a computer or device on a network that manages network resources and is operable to receive requests from third parties on the network and respond to those requests. Requests are sent to a server by a "client", typically an application that runs on a personal computer or workstation and relies on the server to perform some operations.

"Web page" means any documents written in mark-up language including, but not limited to, HTML (hypertext mark-up language) or VRML (virtual reality modeling language), dynamic HTML, XML (extended mark-up language) or related computer languages thereof, as well as to any collection of such documents reachable through one specific Internet address or at one specific site on the World Wide Web ("Web"), or any document obtainable through a particular URL (Uniform Resource Locator).

"Web site" means at least one Web page, and preferably a plurality of Web pages, virtually connected to form a coherent group.

"Web browser" means any client software program running on a computer which can display text, graphics, or both, from Web pages on Web sites. Examples of Web browsers include, without limitation, Netscape Navigator and Microsoft Internet Explorer.

The phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

"Web server" is a server which is capable of serving at least one Web page to a Web browser.

"Default warehouse" means the warehouse assigned to a dealer as its primary warehouse from which it is to receive a product.

"Alternate warehouse" means a warehouse not assigned to a dealer but which is a secondary source from which it may choose to receive a product.

"Allocate" means to apportion for a specific purpose or to particular persons or things.

"Back-order" means the warehouse is temporarily out of stock on a particular item ordered.

"Container" means something that holds goods. In the present specification, a container can hold all or a portion of the contents originally loaded into it.

"Logistics" means any aspect of business dealing with the procurement, maintenance, allocation, transportation and delivery of manufacturer products.

"Divert" to turn from one course or use to another.

"Diversion" means the act or an instance of diverting from a course, activity, or use.

"ETA" means estimated time of arrival.

"Manual operation" means a step performed or done by hand and not by a processor. An example of a manual operation includes, but is not limited to, inputting data to be used by a processor, as opposed to the processor accessing a database having pre-stored data.

For the present invention, a software application could be written in substantially any suitable programming language, which could easily be selected by one of ordinary skill in the art. The programming language chosen should be compatible with the computer by which the software application is executed, and in particular with the operating system of that computer. Examples of suitable programming languages include, but are not limited to, C, C++, CGI, Java and Java Scripts. Furthermore, the functions of the present invention, when described as a series of steps for a method, could be implemented as a series of software instructions, for being operated by a data processor, such that the present invention could be implemented as software, firmware or hardware, or a combination thereof.

The client computers discussed below each preferably include communications hardware and an operating system with graphical user interface (GUI) functionality to allow for interface with the Internet. Each client computer preferably has graphical Web browser software, such as Netscape Navigator or Microsoft Internet Explorer, loaded thereon operable to read and send Hypertext Markup Language (HTML) forms from and to a Hypertext Transfer Protocol (HTTP) server on the Web. The client computers preferably is operable to act as a virtual machine to run Java applets, or the like, downloaded by the browser from the server. The server preferably includes hardware, HTTP compliant software, an operating system and common gateway interface (CGI) software for interfacing with input queries and sources of data. The communication between all clients and servers is preferably via a wide area network (or WAN, not shown), such as for example the Internet.

One basic system configuration for implementing the present invention is depicted in FIG. 1. Order entry client 1 communicates business data to ETA customer order database 2. Order entry client 1 can consist of various order entry systems 1c, 1d, 1e each using a different data interchange method. One customer may, for example, use the well known data EDI interchange method 1a, and another might use a proprietary extranet interchange method 1b to access the network. The Order entry screen server 4 receives data from different sources and communicates the formatted data to the ETA Customer Order database 2 so that the different Order entry systems 1c, 1d, 1e, (collectively Order entry client 1) communicate properly with the ETA Customer Order database 2 and the rest of the system.

Preferably, but not necessarily, the ETA Customer Order database 2 is maintained on a database server, and comprises a relational database management system (RDBMS), in which stored information is arranged in tables of rows and columns, related to one another by predetermined functions, and can be accessed by database query protocols, such as for example the Structured Query Language (SQL). Also, the ETA Customer Order database 2 may in actuality be several databases, such as for example an extranet order database or EDI order database, each of which is maintained on a separate database server.

The ETA Customer Order database 2 communicates customer orders to the ETA calculation server 3. ETA calculation server 3 determines estimated time of arrival information for allocated shipments as well as unallocated product shipments. Unallocated product shipments are shipments which contain products which have not yet been designated a final warehouse destination. Allocated product shipments have been designated to a particular warehouse. Reserved products are allocated products further designated to a customer. The results are communicated to ETA Result database 5 and subsequently fed to the Order entry screen server 4 for further formatting, as described above.

In-transit source 6 collects data related to in-transit cargo and shipments and stores this data in the ETA Delivery Order database 10. Import invoice source 6a transmits information including the identifier for the designated final destination warehouse for a particular shipment. In-transit warehouse transfer source 6b collects information on shipments that are in-transit between warehouses including current location. Similarly, domestic shipping source 6c collects information on shipments that are in-transit to dealers. Other information the in-transit sources 6a, 6b, 6c, can upload to the ETA Delivery Order database 10 includes invoice information, destination, vessel name, container information, and estimated time of arrival (if available). Current warehouse in-stock information system 9 is uploaded to a ETA Delivery Order database 10 as well. This data is communicated to the ETA calculation system 3 to use in calculating ETAs of shipments.

Information from the warehouses inventory source 9 and in-transit source 6 can be uploaded to the ETA result database one or more times a day or can be uploaded in real time as inventory or in-transit shipment information is updated. The update information can be received directly from the shipper (e.g., cargo vessel, trucking company), or by using tables generated using historical data. If delivery order uploads from the ETA Delivery Order database 10 are performed only once, in the morning for instance, then during the daytime product availability and ETA information is based on the data stored as of that time.

Diversion control server 7 controls the allocation of current inventory and in-transit shipments and diverts any, as necessary. This server 7 determines whether an in-transit shipment should be diverted, and communicates its actions to the ETA Delivery Order database 10 so that the ETA Calculation server 3 is made aware of any diversions, which may affect shipment ETA. In addition, server 7 can determine where current in-stock inventory should be shipped. Diversion control server 7 is described in more detail below with reference to FIG. 8.

The Freight Matrix server 8 communicates to the Order entry screen server 4 data used to display alternate warehouse ordering options. These options provide a dealer the capability to pull inventory from other warehouses when there is no inventory at the default warehouse. Freight Matrix server 8 also provides information (via Order entry screen server 4) including additional freight costs incurred when ordering from alternate warehouses. Freight matrix system 8 is described in more detail below with reference to FIG. 9.

The integration of the freight matrix, ETA calculation, and diversion control systems not only provide useful information to customers, but also permit the overall system to optimally allocate shipments. Real time and accurate available data can be provided at all times through a Web site. In addition, the information can be delivered to all of customers regardless of any sales channels or order entry methods. Dealers can make educated decisions on what to order armed with the option to pull from distant available warehouses, review ETA information, and have a clear understanding as to what added freight costs might be incurred. Having diversion capability also allows inventory balance to be controlled for various warehouses by calculating the optimum location and quantity for products while in-transit.

It should be understood, of course, that configurations other than that illustrated in FIG. 1 are also possible. For example, the Order entry screen server 4 may communicate directly with the order entry clients 1 as opposed to formatting data on a server. Or all communications may be through a LAN, or a WAN other than the Internet, or through dedicated connections. Other configurations are possible as well.

Figure 7C:
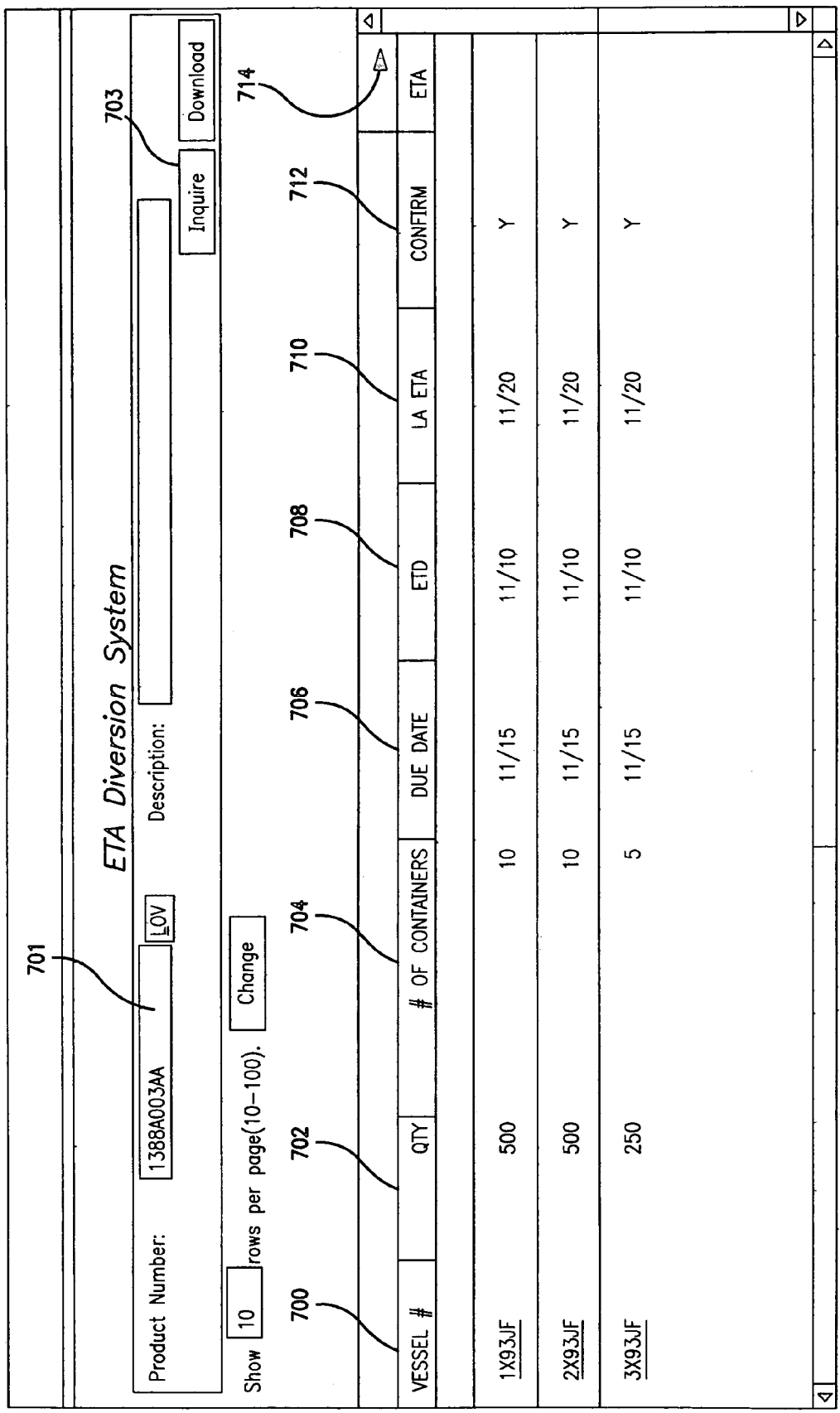
FIG. 7C is an exemplary illustration of an ETA information inquiry screen for showing information about potential in-transit container diversion scenarios for a particular product.
Figure 8:
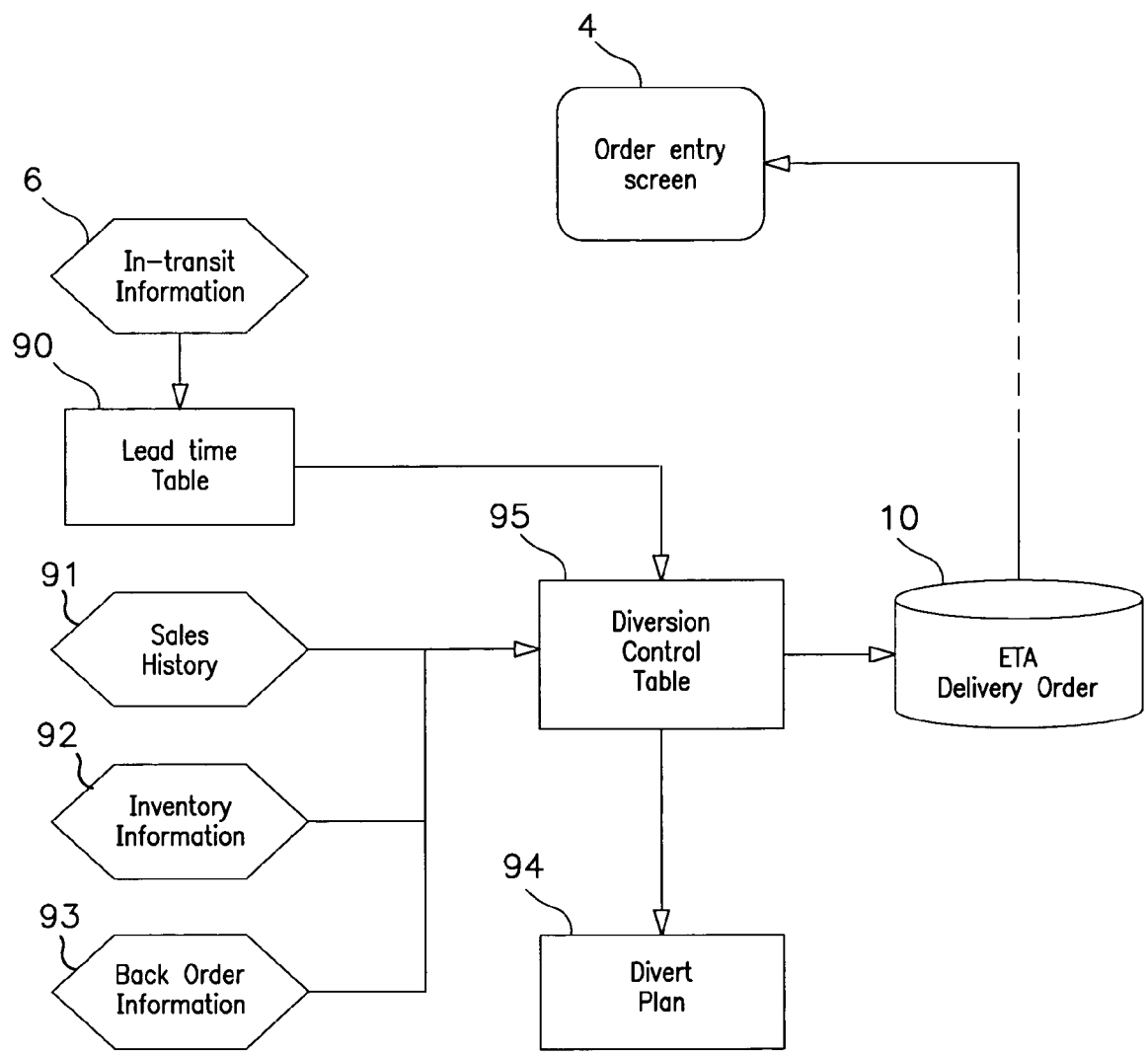
FIG. 8 is a detailed block diagram of an embodiment of the diversion control system in accordance with the present invention.

FIG. 8 is a detailed block diagram of the Diversion Control server 7 discussed above with respect to FIG. 1. Current in-transit information including the location of in-transit containers and their corresponding inventory is collected by In Transit Information source 6. This information is combined with Lead Time Table 90, to provide information as to how long it will take various carrier services to deliver shipments. Lead Time Table 90 can be a database server which can combine the data received from In Transit Information source 6 with its own lead-time data and store it into a database. FIG. 7E is an example of a lead-time table (or can be viewed as a result of a calculation using a lead-time formula) showing how long it takes various carrier services to deliver shipments. The Origin column identifies the port of origin; in this example can be Japan or China. The Transit Time Formula stores the formula (or logic) for calculating transit times.

As discussed above, formulas can vary greatly. For example, one formula may take into account such variables as average speed of a vessel, current and predicted weather and time to unload, while another may not take into account the weather. In addition, data used by the formula can be received (i.e., input) directly from the vessel carrier or transport service and thus the present invention need only add that data to its formula. The precise transit time formula is not important and any such formula is within the scope of this invention.

In addition, different scenarios, depending on which shipping and transport services companies are used, are also stored in the lead time table. In this example, the current transit time it will take a container to reach a warehouse is shown in the Current Transit Time Formula To Warehouse row. Also shown in the Destination column are the transit times it will take for a container to reach a particular destination railway station ("R/R") or warehouse ("W/H"). Here there are five warehouses, located in five different locations, LA, Dallas, Chicago, Atlanta and NJ. The above provides a snapshot of a few exemplary scenarios. There can be many more.

In any event, the in-transit information data is combined to a lead-time table data and communicated to a Diversion Control Table 95. Diversion Control Table 95 can also simply be a database server which holds data and communicates it to other databases. Alternatively, it can be a server that processes the combined data and converts it into a format that can be used by other servers or databases. The latter is the preferable.

Sales history for the various warehouses is collected by the Sales History source 91 and communicated to the Diversion Control Table 95. Current inventory information is collected by the Inventory Information source 92 and warehouse back-order information is collected by the Back Order source 93. Data from these sources are also fed to the Diversion Control Table 95. In the preferred embodiment, after collecting all the data it has received, the Diversion Control Table 95 processes it into a format that can be communicated to the ETA Divert Plan server 94.

Based on the results, the Divert Plan server automatically communicates instructions to divert containers or change container content. These instructions can, for instance be communicated to the shipping companies, loading and unloading docks or anyone else involved in shipping or storing the products.

Diversion Control Table 95 also processes the data into a format that can be communicated to the ETA Delivery Order database 10. Order entry client 1 can then execute a diversion manually.

In addition, ETA Delivery Order database 10 can provide this information to the ETA Calculation server 3 (shown in FIG. 1). ETA Calculation server 3 can then use this information to calculate ETAs for any diversions.

If an in-transit container of products has been diverted, that diversion is recorded by the Diversion Control Table 95 so that the container will not be allocated again. It may be the case, however, that based upon priority status, a container may be allocated again to another warehouse. In addition, a diversion control plan may also be transmitted to someone with authority before execution for approval. For example, a logistics department of a manufacturer may wish to approve all diversions.

Advantageously, the present invention dynamically allocates manufacturer products. It may be the case where it would be inefficient to tag a unit for delivery to a warehouse too early. Or, allocated shipments may be behind or ahead of schedule requiring that replacement allocations be made in order to fulfill obligations.

Figure 6:
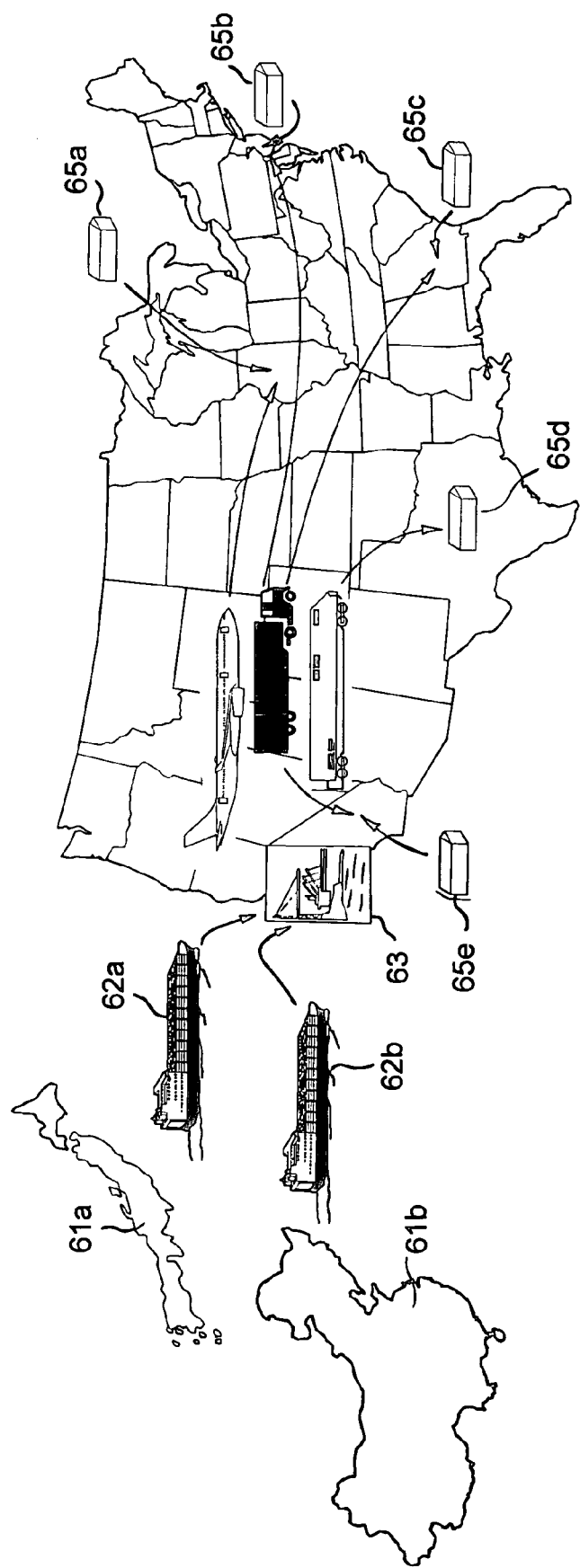
FIG. 6 is an illustration of possible delivery routes a manufacturer's product may travel while in-transit from a manufacturing plant to a warehouse.

For instance, referring to FIG. 6, it may be the case where two of the same type of units, one shipped on ship 62a and the other on ship 62b have different arrival ETA dates at port 63. The ship from Japan 62a is scheduled to arrive at port 63 on Jan. 1, 2004, and the ship from Taiwan 62b is scheduled to arrive at the same port on Jan. 5, 2004. During the oceanic trip, cargo vessel 62a may be delayed due to inclement weather and it is determined that it will arrive at port 63 later than originally expected (i.e., Jan. 5, 2004). With the present invention, any portion of the cargo on the other vessel 62b can be redirected to fulfill delivery order obligations. Thus in this example, if the diversion plan is based on a First-Come-First-Serve model, then the customer that ordered this type of unit first, gets the first one to arrive at port 63, even though it was originally allocated to go somewhere else.

In other words, units on any vessel can be redirected by overriding any previous destination warehouse allocation. The dealer does not know that over the course of a few days different units had been allocated to fulfill a purchase order. All the dealer knows is that a unit having the product number he/she ordered arrived on time, and was charged the expected freight costs. Other factors may dictate cargo allocation as well. A warehouse with a large backorder of a particular product may take precedence over one having it in stock. Or, an operator with high priority status may take precedence and thus redirect shipments.

Each factor used to decide a divert plan can be designated a particular priority which is then stored into a metrics table. The metrics table can then be used to calculate shipping priority. The method in which shipment priority is calculated can be based on a simple formula, or more complex decision logic can be used. Neural network logic, for instance, can be implemented to operate on historical data to determine the best shipping routing strategy. Neural networks work well with both categorical and continuous variables and do not require a linear relationship between predictor and dependent variables. Some well known applications for neural networks are indeed predicting, forecasting, pattern recognition, and/or processing problems, all of which are multivariate and data intensive.

Figure 9:
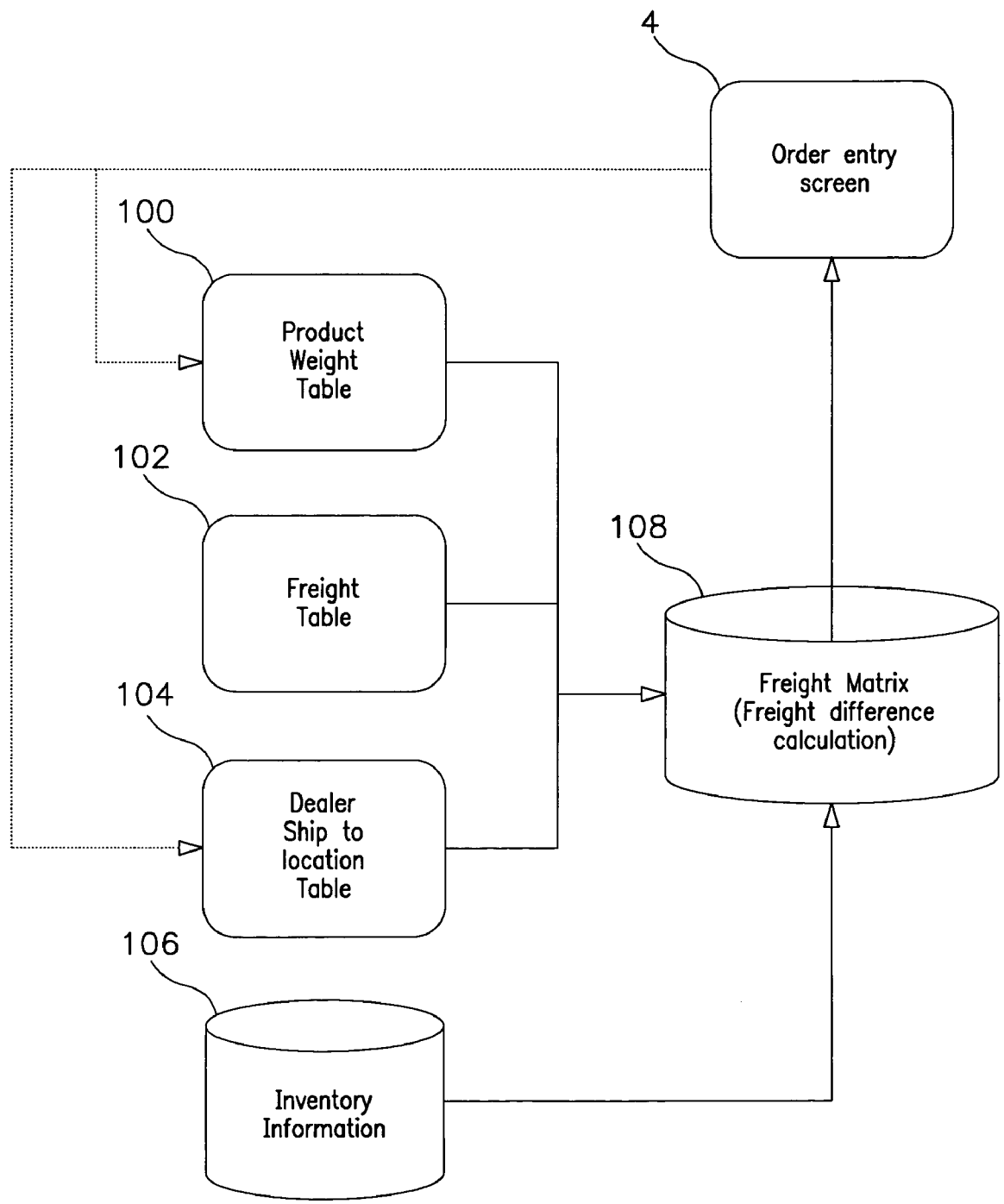
FIG. 9 is a detailed block diagram of an embodiment of the freight cost calculation system in accordance with the present invention.

FIG. 9 is a detailed block diagram of an embodiment of the Freight Matrix server 8 discussed above with respect to FIG. 1. As discussed above, the inventory from other available warehouses can be pulled when there is no inventory at the default warehouse.

Once an order is placed via the Order entry client 1, Freight Matrix server 108 calculates the freight increase amount based on various factors including product weight, freight costs, and the distance between a particular warehouse location and a dealer location. The product weights are stored in a Product Weight Table database 100 which simply matches a particular item number with its corresponding weight. Freight costs are also calculated based on the distance between a particular warehouse location and a dealer location. This determination is made using dealer address information, which can be stored in a Dealer Ship to Location Table database 104. Inventory availability comes from an Inventory Information database 106. Inventory Information database 106 can be fed inventory information by the Stock In Information source 9, discussed above with respect to FIG. 1.

An overview of the shipping process in accordance with the present invention is now presented in terms of transport mechanisms. FIG. 6 shows the travels a product takes after it leaves a manufacturing plant.

After manufacture, the product units are loaded into shipping containers. As shown, container transport vessels 62a and 62b ship the containers from port 61a (which may be in one country) and port 61b (which may be in another country) to a particular port 63 in the United States. At port 63, the containers are unloaded and then transported to one of five warehouses 65a-65e, via rail, truck or air freight. Each container can be tracked to obtain real-time data on its in-transit location. In addition, the contents (i.e., the products) can be ascertained to a high level of detail at any point in time. Even if the contents of a container have changed, the present invention observes the changes to make correct allocation decisions and estimated time of arrival and freight cost calculations.

Normally shipping containers departing ports of origin 61a, 61b are designated final destinations when they depart. However, some are not allocated. Unallocated containers, or "diversion containers", can be allocated to different final destinations during transportation. In other words, final destinations (e.g., final destination port or warehouse) of any diversion containers can be decided at any time before unloading commences at the destination port 63.

In the event a container must be diverted (e.g., to fulfill a backorder), it is typically preferable to allocate a diversion container over an allocated container so as to not disrupt a delivery order. However, sometimes it may more efficient and economical to divert an allocated container to, for instance, fulfill contractual requirements.

Portions of any container, either in the context of diversion containers or allocated containers, can be removed and placed in other containers at any time during transit and assigned a final destination.

The present invention advantageously provides ETA information for any product to any warehouse. As mentioned above, some products are allocated to the warehouses 65a-65e at some time before they reach port 63. Those held in diversion containers are not. In addition, any or all of the contents (i.e., the products) of any container can be diverted for various reasons. Still further, all the allocated and unallocated products ETAs are determined and available to Diversion Control server 7. ETA information may even be provided for a product in-transit even though it has not been allocated.

Thus, the present invention advantageously allows a dealer to make purchase order decisions based not only on what products are available in its default or alternate warehouses, but also in accordance with in-transit shipments anywhere. The present invention saves the customer money in freight costs by essentially permitting the dealer to place inventory in the manufacturer's warehouse. The invention also helps the manufacturer manage working capital, creates cash flow and efficiently manages warehouse inventory at the very least. In addition, the present invention improves customer service.

FIGS. 2-5 are exemplary Web pages for data entry and viewing in accordance with the present invention. FIG. 2 is an illustration of an initial order entry screen which allows entry of basic account and shipping information. Each purchase order is assigned a purchase order number 20. Common shipping and account information is entered at the appropriate fields 21a-k, or the Viewed Saved Orders button 22 is selected which allows an operator to view and modify prior saved orders. Alternatively, an Order Upload button 23 is selected to upload order data files which have been generated previously using an editor or spreadsheet program. Using a saved order or a previously generated order saves time for dealers who order the same, or relatively the same, merchandise often. The operator then selects the. Continue button 24 to continue processing the order or selects a Cancel Order button 25 to cancel the order.

FIG. 3 is an illustration of a supply order details screen displayed to an operator if the Continue 24 button was pressed in the above-described initial Order screen. Item numbers which have been entered or loaded are shown in the Item number ("#") column 31*a*, and their corresponding descriptions are displayed in the Description column 31*b*. The dealer enters the quantity of items requested in the quantity column 31*d*. Using the Ship Complete checkbox 31*e*, the dealer can elect whether the item order should be delivered in one shipment or, if the quantity of items selected is not immediately available, whether the items should be delivered in separate shipments. The Unit Price and total amount for each item is displayed in the Unit Price 31*f* and Amount 31*g* columns, respectively, by selecting the Get Price button 32. Alternatively, this information can be updated automatically as data is entered, thereby eliminating the need for a Get Price button 32.

A Catalog button 33 is available to assist the operator in finding particular products or information about them. The operator can also add or delete item lines by pressing the Add Lines button 34 and Delete Lines button 35, respectively. In addition the operator may customize the header using the Edit Header button 36. Once the items have been entered, the order information can be saved by pressing the Save Order button 37. If the operator presses the Continue button 24, the ETA system will then proceed to a status screen as shown in FIG. 4.

Figure 4:
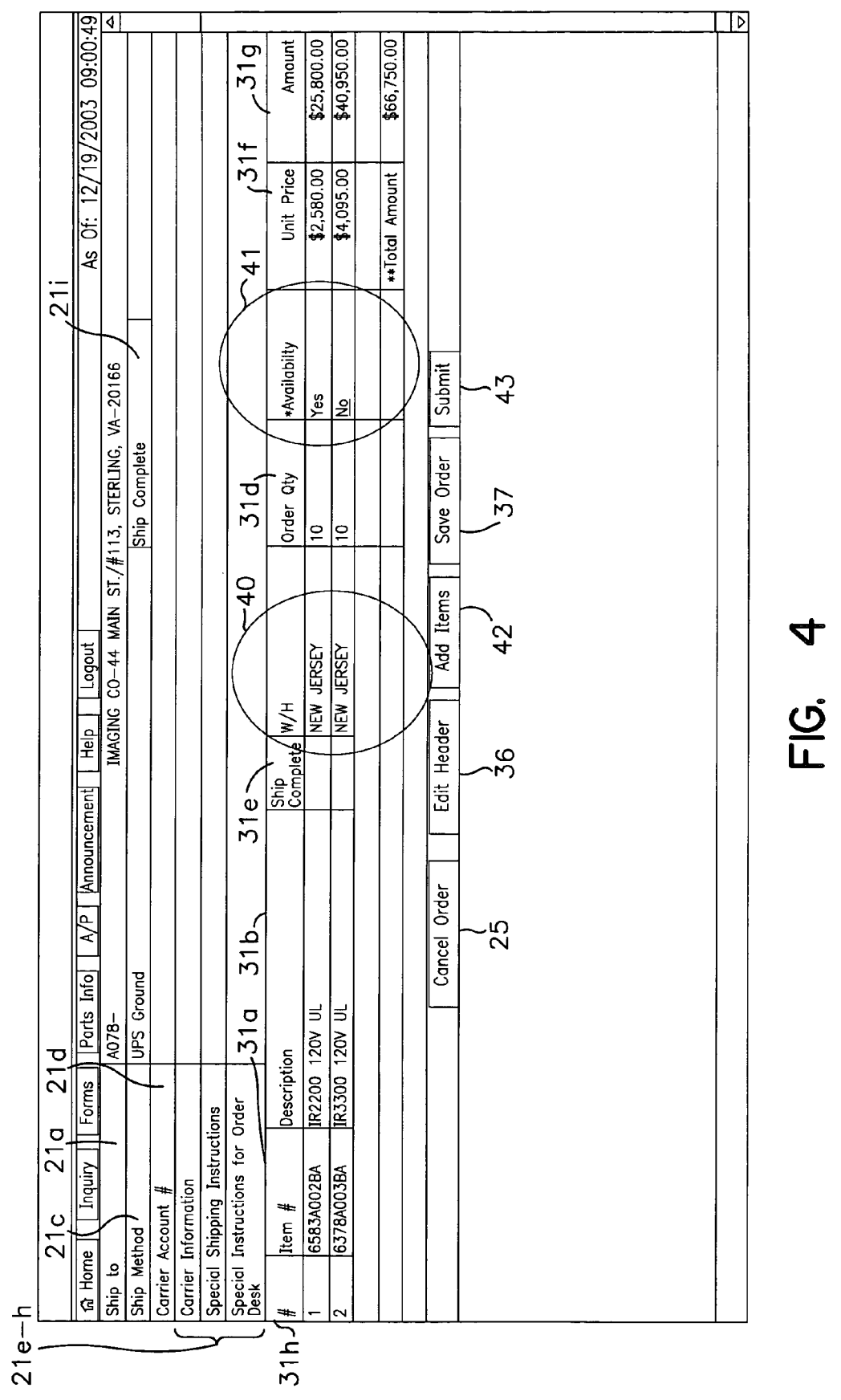

FIG. 4 is an illustration of an order status screen for providing default warehouse availability and cost information, and for hyperlinking to an alternative warehouse information and selection screen. This screen displays the information entered by the operator in the initial order entry screen (FIG. 2) and the order details screen (FIG. 3) described above. As shown in the warehouse (W/H) column 40, this dealer has a contract which designates its default warehouse as the New Jersey warehouse. The Availability column 41 shows the first item is available while the second is not. Additional items can be queried by pressing the Add Items button 42.

The user then has the option to submit the order by pressing the Submit button 43, which then proceeds with the request. Alternatively, the operator has the option to check when the default warehouse will have the item in stock and view other availability options. This is done by selecting the item that is not in stock. In FIG. 4 this is done by selecting the "No" hyperlink in the Availability column 41 which takes the operator to another screen, shown in FIG. 5.

FIG. 5 is an exemplary illustration of an estimated time of arrival information and order option screen, for viewing and selecting default and alternate warehouse delivery order options. This screen can be a pop-up screen (as shown) which extends from the order availability screen discussed above with respect to FIG. 4. Some of the information is the same as presented on the previous screens (FIGS. 2-4). The rest of the screen is divided into two sections, 52 and 54. Section 52 displays information related to the dealer's default warehouse and section 54 displays information related to the dealer's alternate (i.e., secondary) warehouses.

Quantity columns 55 and 58 show whether the quantity of product units requested by the dealer. However, those columns will show less if less are available. If the products are not available, the Status columns 41 and 56 will identify accordingly. If the default warehouse is out of stock, a Stock-In Date column 53 will indicate when the next shipment is expected to arrive. If the requested order is partially available (not shown) the screen would show the quantity of available units in the Quantity column 55 as well as when the remainder will be in stock in the Stock-In-Date column 53. Similarly, if the requested order is partially available (not shown) in the alternate warehouses, the screen would show the quantity of available units in the Quantity column 58 as well as when the remainder will be in stock in a Stock-In-Date column (not shown).

The alternate warehouse section 54 further includes the difference in freight costs corresponding to a particular secondary warehouse, shown in Freight Difference column 57. The freight increases are shown on a percentage basis.

FIG. 7A is an exemplary Web page for viewing warehouse current and projected inventory and backorder status for a particular product. The product is identified in the Product Number field 77 and it has a description noted in the Description field 78. Once a product number has been entered, the operator selects the Inquire button 79 to receive the current inventory status for the product.

Each warehouse is designated numerical values as shown in the warehouse ("W/H") column 80. The corresponding current inventory count for each warehouse is tabulated in the INVENTORY column 81. Identified in the INTRANSIT column 82 is the number of units in-transit to the warehouses 80. In the BACK ORDER column 83 the number of units on back-order is identified. Thus, for example, warehouse 22 (in W/H column 80) does not have product number "6378A003BA" currently in stock, as indicated by its corresponding INVENTORY column 81. Warehouse 22 is expected to receive a relatively large shipment of that product, 432 units to be exact, as indicated in INTRANSIT column 82. Warehouse 22 also has a back-order on that particular product of 33 units.

More detailed information on the shipments of a product to a particular warehouse can be viewed by selecting one of the INTRANSIT column 82 hyperlinks (shown as underlined numbers). For example, if an operator is interested in the information on warehouse 22, "432" under INTRANSIT column 82 can be selected. The screen shown in FIG. 7B is then displayed.

FIG. 7B is an exemplary Web page for displaying information on warehouse 22, particularly relating to its inventory status for a product. Column 70 contains three categories of information. One category, designated section 70*b*, shows the status of the warehouse inventory at a particular time. In this example, for this particular warehouse, inventory information is for the morning. During the morning the warehouse had 94 units available, as shown in the quantity ("QTY") column 72. However, at that time, all 94 units had been allocated, as shown in QTY Allocated column 74.

Another category, designated as section 70*a*, shows in delivery order ("DO #") column 70 that there are five delivery orders to ship the product to warehouse 22. In particular there are five containers identified in Container number column 75, each holding 72 units, as shown in QTY column 72. As shown in QTY Allocated column 74, one container, identified as "NYKU6057975", has 33 of its 72 units allocated to that warehouse. This coincides with the back-order of the product on warehouse 22, discussed above with reference to the BACK ORDER column 83 in FIG. 7A. This allows an operator (or server controlling allocation automatically) to prioritize which shipments should be allocated or diverted first. The ETA dates to the warehouse are identified in ETAWHDATE column 73. Container "NYKU6057975" has been identified as having the earliest arrival date to warehouse 22 and thus units from that container have been allocated first.

Section 70c shows the status of any in-transit shipments between warehouses. This is indicated by the "XFER" designation in the COINTAINER # and INVOICE # columns. Invoice column 76 shows the invoice number for a particular shipment, if available. More details about this transfer shipment, such as method of shipment, can be found by pressing XFER (not shown).

FIG. 7C is an exemplary Web page for showing information about potential in-transit container diversion scenarios for a particular product. After a particular product is entered into the Product Number field 701, the operator selects the Inquiry button 703 to view the information. VESSEL # 700 shows all the vessels currently carrying the product. The quantity ("QTY") column 702 shows how many units of the product each vessel is carrying. The # OF CONTAINERS column 704 shows how many different containers of that product the vessel is carrying. DUE DATE column 706 shows the date by which an allocation must be completed by the operator. This date provides carriers and shippers some time to either repackage the containers or prepare for transport trucks to pick up the goods at the port. Accordingly, in this case, an operator can divert a product shipment only before "November 15".

The ETD column 708 shows the estimated time of departures for the vessels. LA ETA column shows the estimated time of arrival at the LA warehouse. Delivery information can be confirmed either by the shipping company or some other source. If a shipment can be confirmed it shows up in the CONFIRM column 712. Warehouse ETA, number of container and quantity information is also provided for all the other available destination warehouses to which a container of products may be delivered, simply by shifting the screen to the right, as represented by 714. With this knowledge, an operator with authority (or server automatically) can divert containers as needed. This is accomplished by selecting on the Vessel # hyperlink (e.g., "1X93JF"). The screen shown in FIG. 7D will appear, for example, if vessel "1X93JF" is selected.

FIG. 7D is an exemplary Web page for viewing warehouse historical and current sales and inventory allocation and for entering diversion instructions via a manual operation in accordance with the present invention. Some of the same information from the screen shown in FIG. 7C is shown in this screen as well. The product number is shown in the Product Number field 701. The selected vessel number is displayed in the Vessel # field 711a. The Number of containers on this vessel is shown in the # of Containers field 704a. The total quantity of units is displayed in the quantity ("QTY") field 702a. The date by which the allocation must be completed is displayed in the Due Date field 706a.

Additional information is also provided. The total number of products in-transit on this vessel is shown in the In Transit Total field 720. The estimated time of arrival to a port is shown in the ETA Port field 710a.

Information related to warehouses is provided so that the operator can make an informed decision. The warehouse number is displayed in the warehouse ("WH") column 722. Corresponding sales history information, in this case for the past six months, is displayed in the Sales History (6 month) column 724. The current inventory for each warehouse is displayed in the Current Inventory column 726 and the current back order on the warehouses is displayed in the Current Back Order ("B/O") column 728.

An operator diverts containers on the vessel to particular warehouses by entering the quantity of containers to divert in the Diversion # of Container field column 730. This column also shows how many units each container holds. For the operator's convenience, a suggested quantity of units to ship is displayed in the Suggested Diversion Plan column 732. This information is determined based on historical data or other information. The particular formula or logic to make the determination may vary.

The Approve button 737 is selected to begin processing the entered data. The ETA Replied column 734 indicates the quantity product units that have already been reported as allocated to customers. ETA column 736 indicates the estimated time of delivery to the warehouses. Preferably the ETA dates displayed in ETA column 736 in FIG. 7D are the same as the ETA information shown in column 710 and the other warehouse ETA information columns (not shown) in the ETA information inquiry screen shown in FIG. 7C. The dates may be different however, if a shipping or local transport company has not confirmed delivery.

It may be the case that the oceanic shipping company has confirmed arrival to a destination port, but the local shipping company (e.g., a trucking or railroad company) cannot. In this event, the ETA information shown to the operator in FIG. 7C is based on historical data and assumes the local shipping company will be on time. If all the pertinent data is available and current, ETA data displayed on the screens illustrated in FIGS. 7C and 7D will be the same.

Allocation can be automatic, without the need for manual operations based on the suggested diversion plan or any data used to calculate the suggested diversion plan. For instance, diversion can be automatically determined based on the current back orders on the warehouses, their current inventory, sales history or the like.

Figure 10:
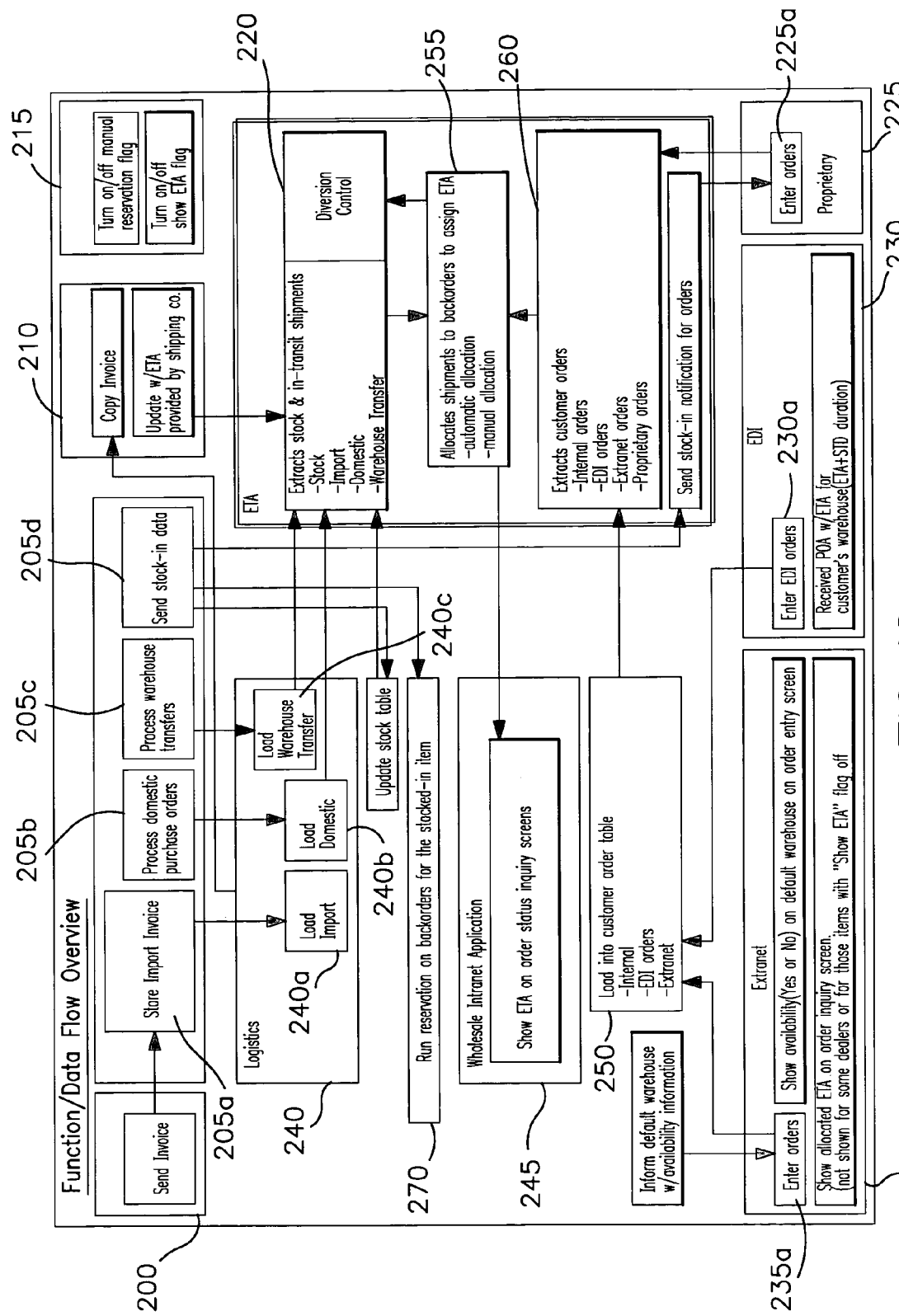
FIG. 10 is a detailed block diagram illustrating an overview of the data flow for implementing the methods and systems of the present invention.
Figure 11:
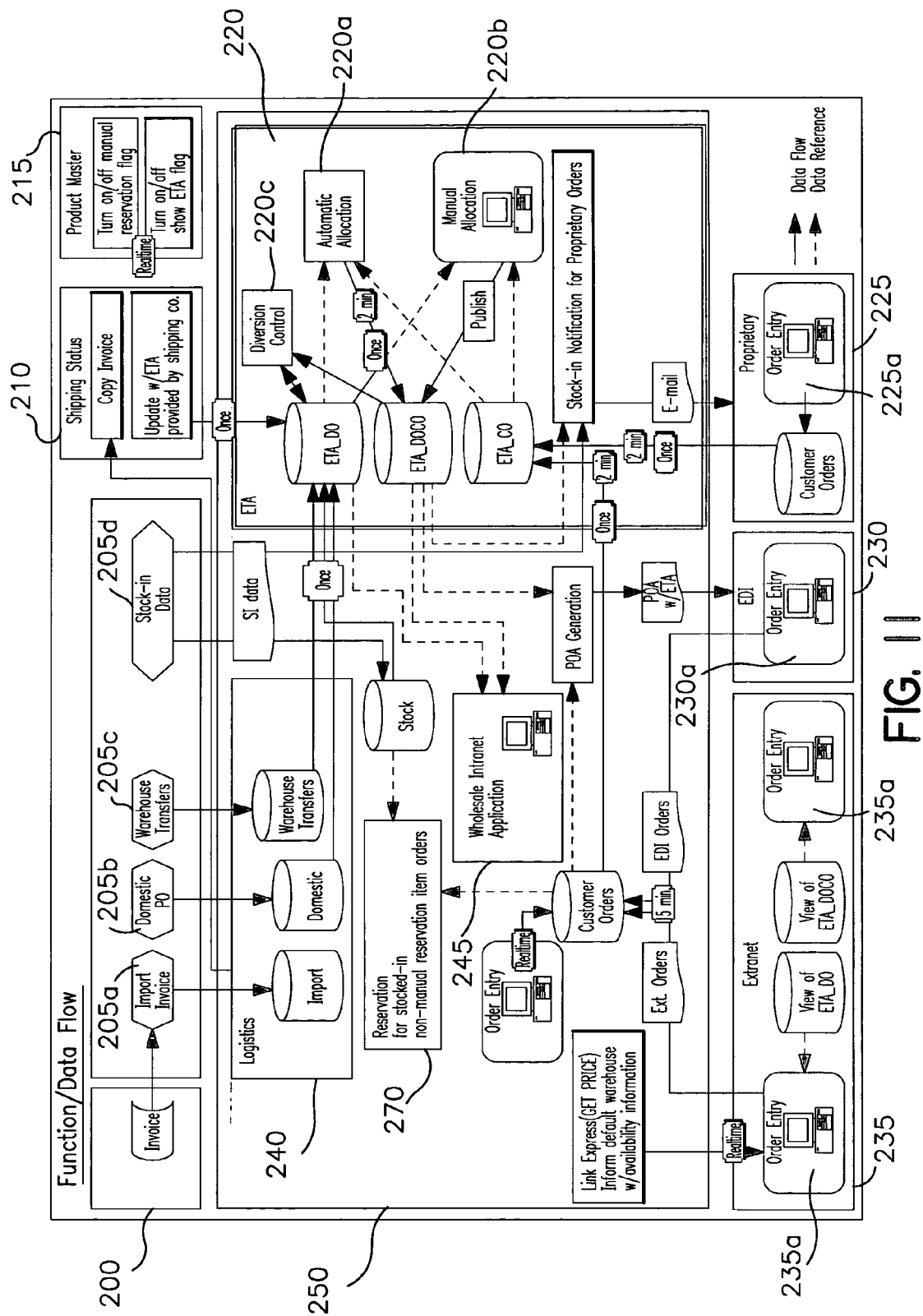
FIG. 11 is a detailed block diagram of an embodiment of the present invention in accordance with the data flow diagram illustrated in FIG. 10.

FIGS. 10 and 11 are detailed block diagrams of an embodiment of the present invention. FIG. 10 shows the data flow and FIG. 11 illustrates a system diagram corresponding to FIG. 10. Any reference to time is merely exemplary and each data transfer interval can be reduced to real time updates or performed periodically. Preferably real time data is used. However, it may be the case that certain information is not available in real time fashion. In such a situation, the present invention can use the most recent information available which has been stored in a database.

As shown in FIG. 10, three types of order entry client systems are used, an extranet client 235, an EDI client 230, and a proprietary client 225. Each of these clients has an order entry terminal for entering orders, 235a, 230a and 225a. As shown, the extranet order terminal 235a can receive default warehouse and availability information and proprietary order terminal 225a can send order requests and receive stock-in notifications for orders. However, EDI client 230 can only enter orders. More generally, all operators may not have permission to perform all functions available on the system, since, for example dealers need not know about certain details such as shipping details, e.g., vessel number or container number, while other operators, for instance those working in logistics or procurement do. In addition, manufacturers may want to keep confidential certain information such as cargo location, customer priority status, shipping company information, freight rates, and the like. Dealers typically need only know when a particular product will become available and for how much.

Data (except for the proprietary client 225 data) is loaded into a customer order table database 250. The proprietary order entry system 225 loads data into its own database and then directly into an ETA customer order database 260. In addition, orders can be placed internally via a terminal attached to the customer order table database.

The logistics database 240 includes databases for storing import invoices, domestic purchase orders, and current inventory. Invoices are generated by the manufacturer 200 and transmitted to the import invoice source 205a. The invoice data contains information such as vessel number, quantity of shipments, number of containers, estimated time of departure, estimated time of arrival to port, ETA to a particular warehouse, the number of containers being delivered to a particular warehouse and the total number of warehouses requiring delivery. In addition, the invoice may contain a due-date for which any allocation must be completed, for example for diversion containers. Thus import invoices may or may not be allocated.

Similarly, domestic purchase order information is received by the domestic purchase order source 205b. Generally, purchase orders are for a particular customer, but it is possible that during an in-transit delivery an order is canceled. In this case it may be optimal to deliver the item to another warehouse or keep it on the transport vehicle until it can be allocated. Similarly inter-warehouse. transfer information is retrieved by the warehouse transfers source 205c. The data from all three in-transit sources (i.e., import invoice 205a, domestic purchase orders 205b and warehouse transfers 205c) is fed into the logistics database.

The logistics databases 240a, 240b and 240c store all the in-transit and current stock information. All the stock and in-transit shipment information is extracted by the ETA server 220.

Shipping status database 210 receives ETA updates from the shipping companies. A copy of the invoices are provided to the shipping company so that it can match up its cargo vessels with the invoices and update the ETA data, as shown in block 210. The shipping company can then transmit corresponding ETA data to the ETA delivery order database 220. Data from the ETA delivery order database 220 and ETA customer order database 260 is then processed by the allocation processor 255 as discussed above.

Diversion control can be performed by the server running the ETA delivery order database 220 as discussed above with respect to FIG. 8. Thus, as shown, both diversion control and allocation can be performed based on delivery order and customer order data.

Block 270 shows an automatic request to reserve product units to current customer backorders. Here, the customer orders are paired up with current in stock data. As units become available, they are delivered to fill the backorders.

ETA and order status inquiries can be made using the wholesale intranet application 245, allowing an operator to view the status of all the orders and allocations including diversion container details.

FIG. 11 illustrates the computer network system for performing an embodiment in accordance with the present invention. In-transit data is collected by invoice source 205a, domestic purchase order source 205b, and warehouse transfer source 205c. The data collected by these sources, including allocated and unallocated (i.e., diversion container) shipment data, are fed into the logistics processor 240 databases, and then transmitted and stored in the delivery order database, ETA_DO, located in the ETA server system. Current inventory data is fed to a Stock database from a stock-in data source 205d. The Stock database data feeds into the ETA_DO database as well. In addition, data related to shipping status, provided by the shipping status source 210, is also stored in the ETA_DO database. Shipping status source 210 provides the location status for in-transit shipments. The origin of this data can received directly from the shipping company. In some cases the shipping company may also require a copy of an invoice to provide information on corresponding shipments. If so, a request for necessary invoice information can be requested to the logistics processor, which responds by feeding the relevant invoice, purchase order, or other transfer related information to the shipping status source 210.

The data from the logistics and current inventory databases, as well as the shipping company status data can be collected in the ETA_DO database once a day, or more frequently. Preferably, this data is collected in real time. However, it may be the case that a data source (e.g., such as the shipping company status source 210) is out of service or cannot meet a real time update requirement. In these cases, the last available update is used. As shown in FIG. 11 much of the data in this example is transmitted once a day, as indicated by the "Once" blocks. However, any one of those blocks can be exchanged with a "Realtime" block indicating a source can transmit data to its corresponding database as soon as it is available. Processing can occur immediately thereafter.

The automatic allocation processor 220a and manual allocation processor 220b operate on the data stored in the ETA_DO database. These processors also operate on the data stored in the customer order database, ETA_CO, which collects all the customer orders from the extranet, EDI and proprietary order systems, 235, 230 and 225, respectively. The results of the processors 220a and 220b operations are subsequently stored in the ETA_DOCO database. As discussed above, the allocation processors can process the data according to any logic formula.

Diversion control is processed by Diversion Control processor 220c as discussed above with respect to FIGS. 8 and 10. This processor can be part of the same server running the ETA delivery order database ETA_DO.

The ETA_DOCO can be referenced by a variety of applications. Order entry terminals 235a, 230a, 225a and internal wholesale intranet application terminal 245 can reference the data to view ETA times and status. And, as mentioned above, those systems with proper authority, can then place orders, make diversions and view costs.

Block 270 links the current inventory status (stored in the Stock database) with the Extranet and EDI order entries and reserves ordered items for allocation to the requester. Extranet and EDI orders can also be reserved by the automatic or manual allocation processors 220a and 220b, respectively, as is done for the proprietary order system 225 customer orders.

The ETA processor 220 designates each item in-transit as allocated or unallocated and can designate whether allocated items can be re-allocated. Placing a code in the corresponding item record allows the ETA server 220 to filter the logistics data. An example of what a user (or automatic processor) sees is illustrated in the example shown in FIG. 7B. As shown in column 74 of FIG. 7B, thirty-three units are allocated to warehouse 22 to fulfill a backorder. The ETA processor coded the item records for thirty-three items as allocated so that those units are re-allocated last. If an earlier shipment of unallocated units having the same model units is expected an exchange can occur, changing the filter codes and causing the previously allocated items to become unallocated or reallocated to a different final destination.

While the invention has been described with reference to the structures disclosed herein, it is not confined to the details set forth and this application is intended to cover such modifications or changes as may come within the purposes of the improvements or the scope of the following claims.

What is claimed is:

1. A system for diverting a quantity of in-transit units having a product number, comprising:
   a terminal configured to transmit to the diversion control server product inquiry information including the product number;
   a diversion control server including a processor configured to calculate a plurality of estimated time of arrivals to a plurality of destinations for a plurality of in-transit units having the product number and a due date associated with the plurality of estimated time of arrivals by which a diversion request must be completed to cause the quantity of in-transit units having the product number to be diverted to at least one destination, wherein the diversion request is based in part on the calculated estimated time of arrivals; and
   the terminal further configured to receive from the diversion control server the plurality of estimated time of arrivals to the at least one destination and the due date, and to transmit to the diversion control server the diversion request to cause the diversion control server to divert the quantity of in-transit units.

2. A system according to claim 1,
   wherein the diversion request includes a shipping carrier identifier, the product number, the quantity, and a destination identifier; and
   wherein the diversion control server is further configured to transmit to the terminal an acknowledgement that the quantity of in-transit units have been diverted to a final destination corresponding to the destination identifier.

3. A system according to claim 1 wherein the diversion control unit is further configured to:
   receive a product purchase order including a product number, the quantity, and a customer identifier,
   transmit to the terminal an acknowledgement that the product purchase order has been accepted, and divert the quantity of in-transit units of that product number to a final destination based on the customer identifier.

4. The system according to claim 1, wherein the due date by which an allocation must be completed is based on when the quantity of in-transit units will be coded as unavailable for diversion.

5. The system according to claim 1, further comprising:
   a sales history server communicatively coupled to the diversion control server and configured to collect sales history information and transmit a sales history value corresponding to one of the plurality of destinations.

6. The system according to claim 1, further comprising:
   an inventory information server configured to collect inventory information and transmit to the terminal a current inventory value for one of the plurality of destinations.

7. The system according to claim 1, further comprising:
   a back order information server configured to collect back order information and transmit a current back order value for one of the plurality of destinations.

8. The system according to claim 1, wherein the quantity of in-transit units is represented by a number of containers holding the plurality of in-transit units.

9. The system according to claim 8, wherein the diversion control server is further configured to transmit to the terminal a number representing how many units a container holds.

10. The system according to claim 1, wherein the diversion control server is further configured to calculate a suggested quantity of in-transit units to divert to one of the plurality of destinations.

11. The system according to claim 10, wherein the diversion control server is further configured to calculate the suggested quantity of in-transit units to divert based on historical allocation data of the plurality of destinations.

12. A method of diverting a quantity of in-transit units having a product number, the method comprising the steps of:
    transmitting product inquiry information including the product number;
    calculating a plurality of estimated time of arrivals to a plurality of destinations for a plurality of in-transit units having the product number and a due date associated with the plurality of estimated time of arrivals by which a diversion request must be completed to cause the quantity of in-transit units having the product number to be diverted to at least one destination, wherein the diversion request is based in part on the calculated estimated time of arrivals;
    receiving the plurality of estimated time of arrivals to the at least one destination and the due date; and
    transmitting the diversion request to cause the quantity of in-transit units to be diverted.

13. A method as set forth in claim 12, further comprising the steps of:
    generating an acknowledgement that the quantity of in-transit units have been diverted to a final destination, wherein the diversion request includes a shipping carrier identifier, the product number, the quantity, and a destination identifier.

14. A method as set forth in claim 12, further comprising the steps of:
    receiving a product purchase order including the product number, the quantity, and a customer identifier;
    transmitting an acknowledgement that the product purchase order has been accepted; and
    diverting the quantity of in-transit units of that product number to a final destination based on the customer identifier.

15. The method according to claim 12, further comprising the step of: transmitting the due date by which an allocation must be completed.

16. The method according to claim 12, further comprising the steps of:
    collecting sales history information; and
    transmitting a sales history value corresponding to one of the plurality of destinations.

17. The method according to claim 12, further comprising the steps of:
    collecting inventory information; and
    transmitting a current inventory value for one of the plurality of destinations.

18. The method according to claim 12, further comprising the steps of:
    collecting back order information; and
    transmitting a current back order value for one of the plurality of destinations.

19. The method according to claim 12, wherein the quantity of in-transit units is represented by a number of containers holding the plurality of in-transit units.

20. The method according to claim 19, further comprising the step of:
    transmitting a number representing how many units a container holds.

21. The method according to claim 12, further comprising the step of:
    calculating a suggested quantity of in-transit units to divert to one of the plurality of destinations.

22. The method according to claim 21, further comprising the step of calculating the suggested quantity of in-transit units to divert based on historical allocation data of the plurality of destinations.

23. A system for diverting a quantity of in-transit units having a product number, the system comprising:
means for transmitting product inquiry information including the product number;
means for calculating a plurality of estimated time of arrivals to a plurality of destinations for a plurality of in-transit units having the product number and a due date associated with the plurality of estimated time of arrivals by which a diversion request must be completed to cause the quantity of in-transit units to be diverted to at least one destination, wherein the diversion request is based in part on the calculated estimated time of arrivals;
means for receiving the plurality of estimated time of arrivals to the at least one destination and the due date; and
means for transmitting the diversion request to cause the quantity of in-transit units to be diverted.

24. A system as set forth in claim 23,
wherein the diversion request includes a shipping carrier identifier, the product number, the quantity, and a destination identifier, and further comprising:
means for generating an acknowledgement that the quantity of in-transit units have been diverted to a final destination.

25. A system as set forth in claim 23, further comprising:
means for receiving a product purchase order including the product number, the quantity, and a customer identifier;
means for transmitting an acknowledgement that the product purchase order has been accepted; and
means for diverting the quantity of in-transit units of that product number to a final destination based on the customer identifier.

26. The system as set forth in claim 21, further comprising:
means for transmitting the due date by which an allocation must be completed.

27. The system as set forth in claim 23, further comprising:
means for collecting sales history information; and
means for transmitting a sales history value corresponding to one of the plurality of destinations.

28. The system as set forth in claim 23, further comprising:
means for collecting inventory information; and
means for transmitting a current inventory value for one of the plurality of destinations.

29. The system as set forth in claim 23, further comprising:
means for collecting back order information; and
means for transmitting a current back order value for one of the plurality of destinations.

30. The system as set forth in claim 23, wherein the quantity of in-transit units is represented by a number of containers holding the plurality of in-transit units.

31. The system as set forth in claim 30, further comprising:
means for transmitting a number representing how many units a container holds.

32. The system as set forth in claim 23, further comprising:
means for calculating a suggested quantity of in-transit units to divert to one of the plurality of destinations.

33. The system as set forth in claim 32, further comprising:
means for calculating the suggested quantity of in-transit units to divert based on historical allocation data of the plurality of destinations.

34. A computer-readable medium having stored thereon code which when executed by a computer system causes the computer system to perform:
transmitting product inquiry information including a product number;
calculating a plurality of estimated time of arrivals to a plurality of destinations for a plurality of in-transit unit having the product number and a due date associated with the plurality of estimated time of arrivals by which a diversion request must be completed to cause a quantity of in-transit units having the product number to be diverted to at least one destination, wherein the diversion request is based in part on the calculated estimated time of arrivals;
receiving the plurality of estimated time of arrivals to the at least one destination and the due date; and
transmitting the diversion request to cause the quantity of in-transit units to be diverted.

35. Computer-readable medium according to claim 34, having stored thereon code which causes the computer system to perform:
generating an acknowledgement that the quantity of in-transit units have been diverted to a final destination; and
wherein the diversion request includes a shipping carrier identifier, the product number, the quantity, and a destination identifier.

36. Computer-readable medium according to claim 34, having stored thereon code which causes the computer system to perform:
receiving a product purchase order including a product number, the quantity, and a customer identifier;
transmitting an acknowledgement that the product purchase order has been accepted; and
diverting the quantity of in-transit units of that product number to a final destination based on the customer identifier.

37. Computer-readable medium according to claim 34, wherein the date by which an allocation must be completed is based on when the quantity of in-transit units will be coded as unavailable for diversion.

38. Computer-readable medium according to claim 34, having stored thereon code which causes the computer system to perform:
collecting sales history information; and
transmitting a sales history value corresponding to one of the plurality of destinations.

39. Computer-readable medium according to claim 34, having stored thereon code which causes the computer system to perform:
collecting inventory information; and
transmitting a current inventory value for one of the plurality of destinations.

40. Computer-readable medium according to claim 34, having stored thereon code which causes the computer system to perform:
collecting back order information; and
transmitting a current back order value for one of the plurality of destinations.

41. Computer-readable medium according to claim 34, wherein the quantity of in-transit units is represented by a number of containers holding the plurality of in-transit units.

42. Computer-readable medium according to claim 41, having stored thereon code which causes the computer system to perform:
transmitting a number representing how many units a container holds.

43. Computer-readable medium according to claim 34, having stored thereon code which causes the computer system to perform:

calculating a suggested quantity of in-transit units to divert to one of the plurality of destinations.

44. Computer-readable medium according to claim 43, having stored thereon code which causes the computer system to perform:

calculating the suggested quantity of in-transit units to divert based on historical allocation data of the plurality of destinations.

* * * * *